Patented June 23, 1931

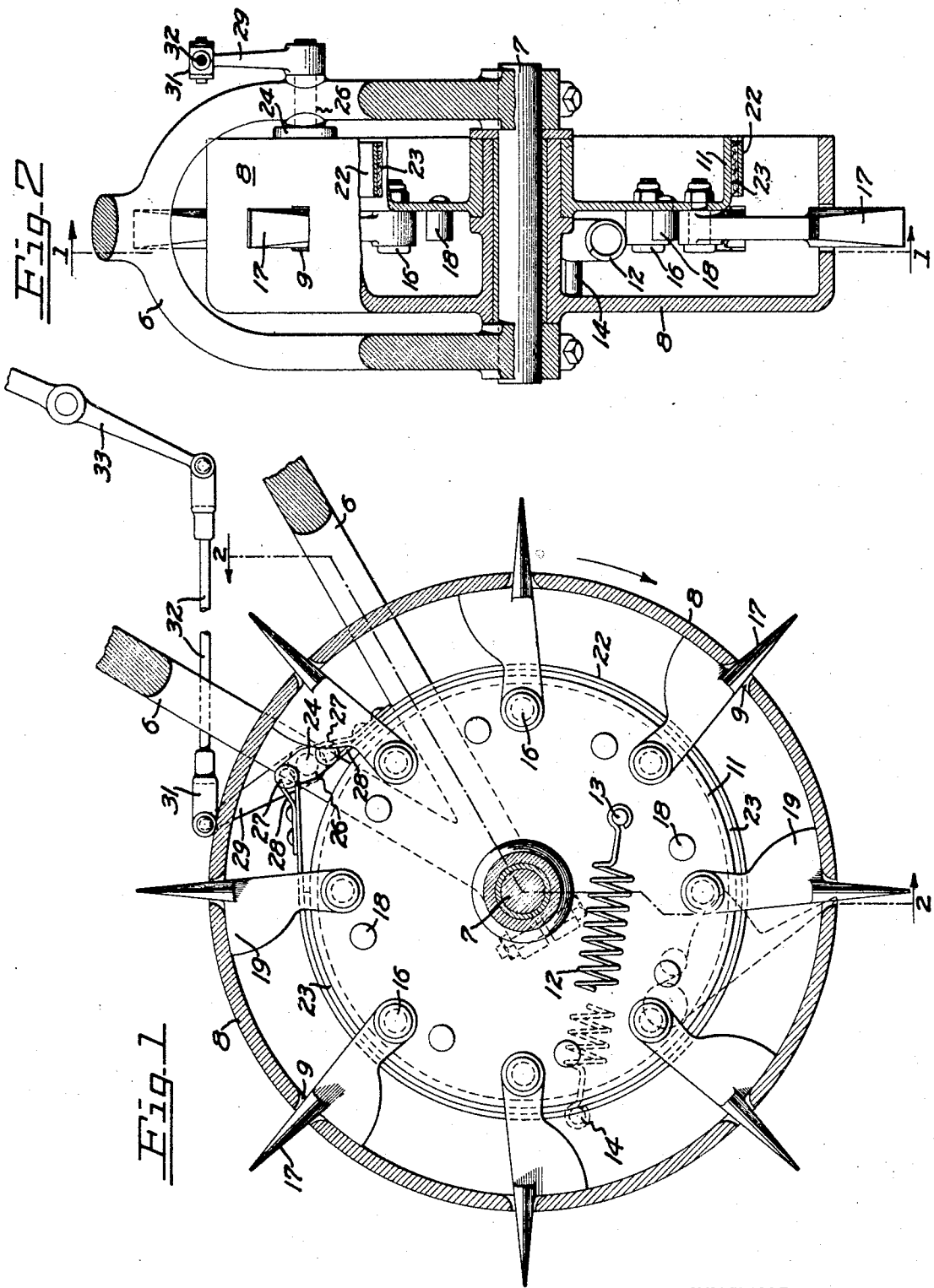

1,811,199

UNITED STATES PATENT OFFICE

SAMUEL C. IRVING, OF BERKELEY, CALIFORNIA

AIRPLANE LANDING BRAKE

Application filed April 17, 1929. Serial No. 355,954.

My invention relates to landing wheels for aircraft, and particularly to rear wheels in which the functions of wheel, brake, and tail skid are combined.

An object of my invention is to provide a brake mechanism for aircraft in which the danger of nosing over on landing is practically eliminated.

Another object of my invention is to provide a tail support in an airplane landing gear which will not materially retard the plane in taking off.

Another object of my invention is to provide an airplane tail support whose retarding effect is under the control of the pilot, and which may either be extremely small or much greater than that of the usual tail skid.

In order to achieve the above mentioned objects, it is another object of my invention to provide an airplane landing wheel having grousers and to provide a practical method whereby these grousers may be extended or retracted under the control of the pilot.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

Referring to the drawings;

Figure 1 is a sectional view of a landing wheel embodying my invention, the plane of section being perpendicular to the axis of the wheel and indicated by the line 1—1 of Figure 2.

Figure 2 is an axial sectional view of the landing wheel shown in Fig. 1, the plane of section being indicated by the line 2—2 of Fig. 1.

Broadly considered, my invention comprises a rear landing wheel for an airplane, within the periphery of which grousers, i. e., spikes or cleats for engaging the earth, are movably mounted. A braking element is mounted for rotation with the wheel, and means are provided whereby the application of the brake causes the grousers to project from the wheel into operative position, thus greatly increasing the traction of the wheel upon the landing surface when it is most needed.

Describing a preferred embodiment of my invention in more detailed terms, a fork 6 mounted upon the body of the plane carries an axle 7 upon which a drum-shaped wheel 8 is journaled. Apertures 9 are formed at regular intervals around the rim of the wheel.

A brake drum 11 is also journaled for movement about the axle 7, the drum being mounted within the wheel and having a materially smaller diameter. Wheel and drum are movable relative to each other, but this movement is resisted by a tension spring 12 whose ends are fastened to a stud 13 secured to the brake drum, and to another stud 14 secured to the wheel.

Pivotally mounted upon studs 16 secured to the disk surface of the brake drum 11 are spike or cleat-shaped grousers 17, spaced equally about the drum, and equal in number to the apertures 9 through which their points project. The pivotal movement of the grousers is limited by studs or stops 18 mounted on the brake drum, and also by the heavy lugs 19, which are formed on one side of each of the grousers, and which are adapted to engage the inner surface of the wheel rim, as is shown by the full lines in Fig. 1.

It will be seen that the tension spring 12 tends to rotate the drum 11 with respect to the wheel 8, thus causing the grousers to rotate upon their pivotal mountings until they lie in the position shown by the dotted lines in Fig. 1, in which position they are retained by the stops 18. In this position, the points of the grousers engaging the edge of the apertures 9 prevent further relative rotation. This may be termed the normal position of the grousers, and when in this position the wheel 8 is a simple, free-running, landing wheel, which offers little resistance to taxiing and is better suited to taking off than the ordinary tail skid.

Surrounding the brake drum 11 is a brake band 22 which is provided with the usual lining 23, and which may be actuated by any suitable mechanism. One such mechanism, which is simple and effective, is that shown, comprising a rocker arm 24 having a shaft 26 which is journaled in one arm of the fork 6. The ends of the rocker arm carry studs 27 which engage loops 28 in the ends of the brake band. The rocker arm is actuated by a crank 29 connected by a clevis 31 to the brake rod 32, which may be actuated from the cockpit of the plane by means of a suitable lever 33.

When the brake is applied, traction on the surface of the wheel rim causes it to rotate relatively to the drum in the direction of the arrow, which swings the grousers into the full line position in which they dig into the earth and greatly increase the traction upon the wheel.

The grousers themselves serve as stops to limit the relative movement of brake drum and wheel. It is obvious, however, that additional stops may be provided where the duty upon the wheel is particularly severe, or where, for other reasons, it is deemed inadvisable to rely wholly upon the grousers.

The landing wheel thus described is designed particularly as a tail wheel to be mounted under the rear end of the fuselage in place of the customary tail skid. Where the wheel is so mounted and the tail of the plane is depressed to hold it firmly against the ground, maximum braking effort may be applied without the plane tending to nose over, which frequently causes serious accidents with the conventional type of brake. The retarding effect of the wheel with the grousers extended is much greater than is possible with the usual type of tail skid, which, since it occupies identical positions in landing and in taking off, must be made to offer low resistance. The device of the present invention is therefore much more efficient under both conditions of service.

I claim:

1. In an airplane landing gear, a wheel, grousers movably mounted on the wheel, a brake for said wheel, and means for moving said grousers into operative position when the brake is applied.

2. In an airplane landing gear, a wheel, grousers retractably mounted on said wheel, means for holding said grousers normally in retracted position, a brake for said wheel, and means actuated by said brake for extending said grousers.

3. An airplane landing wheel comprising an apertured rim, a coaxial braking element movable relative to said rim, grousers movably mounted on said wheel in register with the apertures of said rim and extensible therethru upon said relative movement, means for resisting said movement, and means for applying said braking means to effect said movement.

4. An airplane landing wheel comprising an apertured rim, a coaxial element movable relative to said rim, grousers pivotally mounted on said element for movement in the plane of rotation of said wheel and thru the apertures in said rim, means for limiting said relative movement, and means for retarding rotation of said element to effect said relative movement and extend said grousers thru said apertures.

5. In an airplane landing gear, a wheel, grousers movably mounted on said wheel, and a brake drum on said wheel for actuating the grousers.

6. In an airplane landing gear, a wheel, grousers movably mounted on said wheel, a brake drum on said wheel, and a brake band for retarding the drum to actuate the grousers.

7. In an airplane landing gear, a wheel, grousers movably mounted on said wheel, a brake drum on said wheel and movable relative thereto, and a brake band for causing relative movement between the wheel and drum to actuate the grousers.

8. In an airplane landing gear, a wheel, grousers movably mounted on said wheel, a brake band for retarding the drum to actuate the grousers, and means for engaging the brake band with the drum.

9. In an airplane landing gear, a wheel, a brake controlled drum movably mounted on said wheel, and grousers movably mounted on said wheel and operatively connected to said drum.

10. In an airplane landing gear, a wheel, a brake controlled drum movably mounted on said wheel, grousers movably mounted on said wheel and operatively connected to said drum, and a spring interposed between the drum and the wheel to effect the recovery movement of the drum.

In testimony whereof, I have hereunto set my hand.

SAMUEL C. IRVING.